United States Patent [19]

Schumacher

[11] Patent Number: 4,976,163
[45] Date of Patent: Dec. 11, 1990

[54] REACTIONLESS ACTUATOR-GIMBAL SYSTEM

[76] Inventor: Larry Schumacher, 18876 Tenderfoot Trail, Newhall, Calif. 91321

[21] Appl. No.: 415,703

[22] Filed: Oct. 2, 1989

[51] Int. Cl.$^5$ ............................................. G01C 19/30
[52] U.S. Cl. ..................................................... 74/5.47
[58] Field of Search ................. 74/5.47, 5.34; 248/183

[56] References Cited

U.S. PATENT DOCUMENTS

| | | | |
|---|---|---|---|
| 2,707,400 | 5/1955 | Manger | 74/5.34 X |
| 2,771,779 | 11/1956 | Schaffer et al. | 74/5.47 X |
| 3,279,086 | 10/1966 | Schlitt et al. | 74/5.47 X |

*Primary Examiner*—Rodney H. Bonck

[57] ABSTRACT

The AZ-EL embodiment of the reactionless actuator-gimbal system is a system of gimbal structure, reactionless actuators, a reaction wheel and momentum control means rotationally articulating a payload around axes approximately through the payload's mass center while transmitting minimum reaction torques to the support structure.

The EL-XEL embodiment of the reactionless actuator-gimbal system is a system of gimbal structure, and reactionless actuators rotationally articulating a payload around two axes approximately orthogonal to the payload line of sight and approximately through the payload's mass center while transmitting minimum reaction torques in response to periodic disturbances to the support structure.

The payload-gimbal elevation axis in both embodiments have:

1. constant payload inertia with their reactionless actuator flywheels sized to cancel the payload angular momentum with negligible reaction torques;
2. azimuth axis inertia a function of payload elevation angle.

In the AZ-EL embodiment, the azimuth reactionless actuator flywheel is sized to offset the minimum azimuth inertia. When the payload elevation angle causes the azimuth inertia to exceed the minimum azimuth inertia, a reaction wheel supplements the reactionless actuator flywheel momentum, and a reaction wheel controller controls the reaction wheel flywheel rate to minimizes payload-gimbal articulation disturbances to the support structure.

In the EL-XEL embodiment, the elevation and cross-elevation axes are reactionless axes orthogonal to the payload line of sight intended to remove periodic pointing disturbances without creating disturbances. The EL-XEL azimuth axis provides coarse payload azimuth pointing without attempting to remove periodic pointing disturbances.

4 Claims, 2 Drawing Sheets

REACTIONLESS ACTUATOR-GIMBAL SYSTEM

FIELD OF THE INVENTION

The invention is a gimbal system supporting an object so that it can be controllably rotated.

DESCRIPTION OF THE PRIOR ART

As the development of space proceeds, the supporting structure for pointed instruments has become very large and flexible. In order to point the instruments stably while attached to a flexible structure requires that the instrument pointing system remove the pointing effects of the disturbance without exciting structural resonances or introducing additional pointing disturbance. Reactionless pointing methods are intended to transfer negligible torques to supporting structure during payload rotational articulation.

Torquing a payload with a constant inertia relative to a constant flywheel inertia is potentionally reactionless when the sum of the payload momentum and the flywheel momentum is continuously constrained to approximate zero. The reactionless harmonic drive actuator uses a novel configuration constraining the ratio of payload rotational speed to flywheel rotational speed to a negative constant making the net momentum approximately zero for correctly proportioned constant payload and flywheel inertias.

A problem appears when rotationally articulating a payload inertia that is not constant relative to the rotational axis. Elongated cylindrical payloads such as telescopes are an example. The telescope inertias around the axes orthogonal the cylindrical axis are many times the inertia around the cylindrical axis. The preferred telescope rotational articulation axes are:

1. the elevation axis fixed in the gimbal structure articulating a payload axis orthogonal to the payload cylindrical axis with an inertia many times the cylindrical axis inertia;
2. the azimuth axis fixed in the support structure orthogonal to the elevation axis articulating an elevation angle dependent payload inertia.
3. the cross elevation axis in the gimbal structure articulating, through a limited angular range, the payload axis orthogonal to the payload cylindrical axis and the elevation axis with an inertia many time the cylindrical axis inertia.

Accordingly, the object of this invention is to provide a reactionless pointing system to rotationally articulate payloads with constant and nonconstant inertias around the payload articulation axes.

SUMMARY OF THE INVENTION

The reactionless AZ-EL actuator-gimbal system is a system of gimbal structure, reactionless actuators, a reaction wheel and momentum control means rotationally articulating a payload around axes approximately though the payload's mass center while transmtting minimum reaction torques to the support structure.

A reactionless actuator torques the payload relative to a constant inertia flywheel. A novel actuator configuration has a harmonic drive gear which maintains the ratio of payload rotational rate to flywheel rotational rate a negative constant and cancels other payload torques with torques from the interaction of the harmonic drive wave generator, th harmonic drive flexspline and the harmonic drive circular spline.

The two payload-gimbal system embodiments described here have elevation axes with constant payload inertia, and the elevation reactionless flywheels are sized to torque the payload with negligible reaction torques.

The reactionless AZ-EL gimbal system embodiment has a payload azimuth axis inertia which is a function of payload elevation angle. The azimuth reactionless actuator flywheel is sized to offset the minimum azimuth inertia. When the payload elevation angle causes the azimuth inertia to exceed the minimum azimuth inertia, a reaction wheel supplements the azimuth reactionless actuator flywheel momentum until the sum of the payload, reactionless actuator flywheel, and reaction wheel momentum are zero.

The reactionless AZ-EL gimbal system reaction wheel controller calculates the azimuth payoad-gimbal inertia from the measured elevation angle, determines the azimuth gimbal axis rate from the measured azimuth reactionless actuator flywheel rate, and controls the reaction wheel flywheel rate to minimizes payload-gimbal articulation disturbances to the support structure.

The reactionless EL-XEL gimbal system embodiment has mutually orthogonal elevation and cross-elevation axes always approximately orthogonal to the payload line of sight. The reactionless elevation and cross-elevation actuator flywheels are sized to minimize reaction torques while torquing the constant payload cross-elevation inertia.

The reactionless EL-XEL gimbal system azimuth axis is parallel to the cross-elevatiom axis when the payload elevation angle is approximately ninety degrees. The azimuth actuator is not reactionless being used for coarse payload pointing and does not attempt to remove periodic pointing disturbances.

DESCRIPTION OF THE PREFERRED EMBODIMENT

Figure 1:
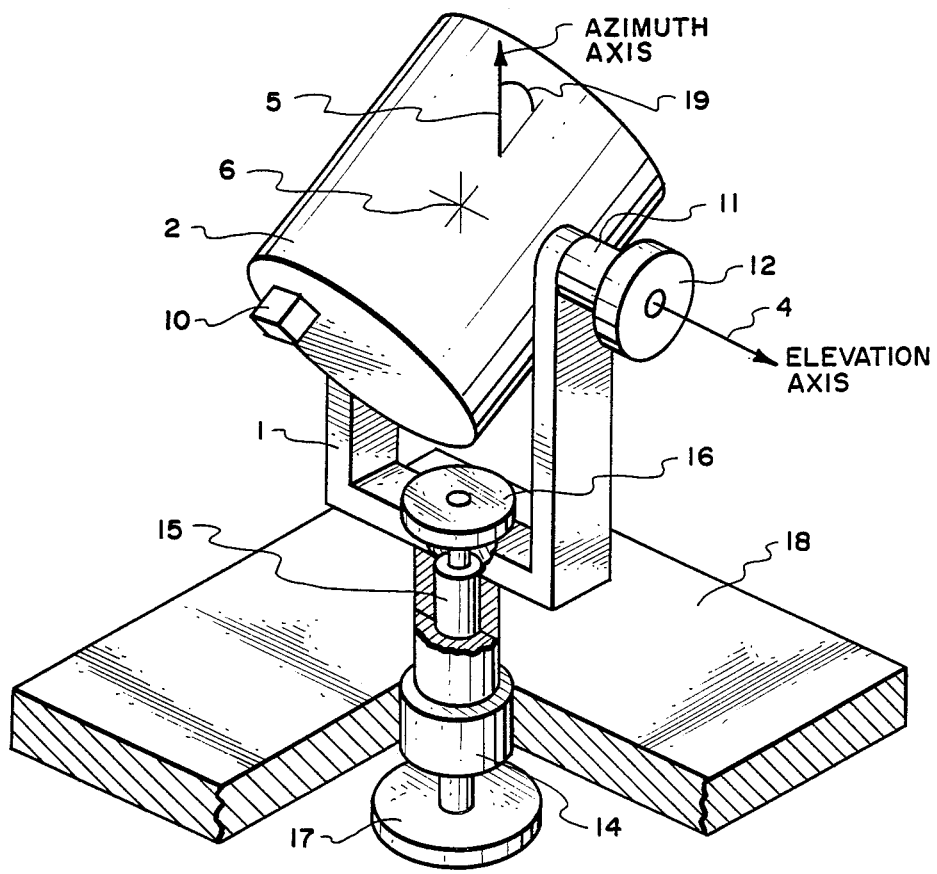
FIG. 1 illustrates the AZ-EL reactionless actuator-gimbal system configuration.

FIG. 1 illustrates AZ-EL reactionless actuator-gimbal system gimbal structure 1 providing payload 2 rotational freedom around elevation axis 4, and azimuth axis 5. Axes 4, and 5 are intended to approximately intersect the combined mass center 6 of payload 2 and inertial reference unit 10.

Elevation reactionless actuator 11 torques a constant inertia including payload 2 and inertial reference unit 10 relative to elevation reactionless actuator flywheel 12, and transfers all non-acceleration torques to structure 1.

Azimuth reactionless actuator 14 torques an inertia including structure 1, reaction wheel 15, reaction wheel flywheel 16, payload 2 azimuth inertia, elevation reactionless actuator 11, elevation reactionless actuator flywheel 12 and inertial reference unti 10, relative to azimuth reactionless actuator flywheel 17, and transfers all non-acceleration torques to support structure 18.

Because payload 2 azimuth inertia increases with elevation angle 19, the angular momentum of the payload exceeds the momentum of the azimuth reactionless actuator flywheel 17 for elevation angles 19 greater than zero. The momentum of reaction wheel 15 is controlled by a reaction wheel control means to supplement the momentum of the azimuth reactionless actuator flywheel 17 such that the combined azimuth momentum of payload 2, gimbal structure 1 and flywheel 17 is approximately zero. The reaction wheel motor is attached to gimbal structure 1 so that the reaction wheel flywheel 16 rotational axis is approximately parallel to azimuth axis 5.

Figure 2:
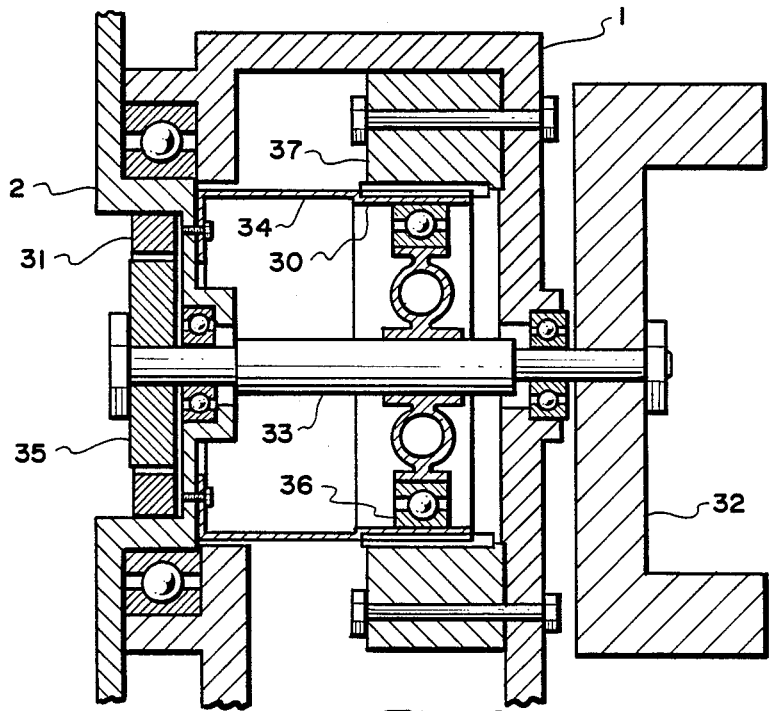
FIG. 2 illustrates a half section view of the elevation reactionless actuator.

FIG. 2 illustrates a half section view of the elevation reactionless actuator 11 demonstrating the generic features of reactionless actuators using a harmonic drive 30. Payload 2 is attached to a harmonic drive actuator motor stator 31 and the harmonic drive actuator flexspline 34. The harmonic drive actuator flywheel 32 is attached to shaft 33 which is also attached to a harmonic drive actuator motor rotor 35 and the harmonic drive actuator wave generator 36. The harmonic drive actuator circular spline 37 is attached to gimbal structure 1.

Motor rotor 35 and flywheel 32 are torqued relative to the payload 2 by the motor stator 31. Frictional and other torques on payload 2 created by bearings and other sources are offset by torque on payload 2 resulting from the interaction of wave generator 36, flexspline 34 and circular spline 37 which is transferred to structure 1.

Figure 3:
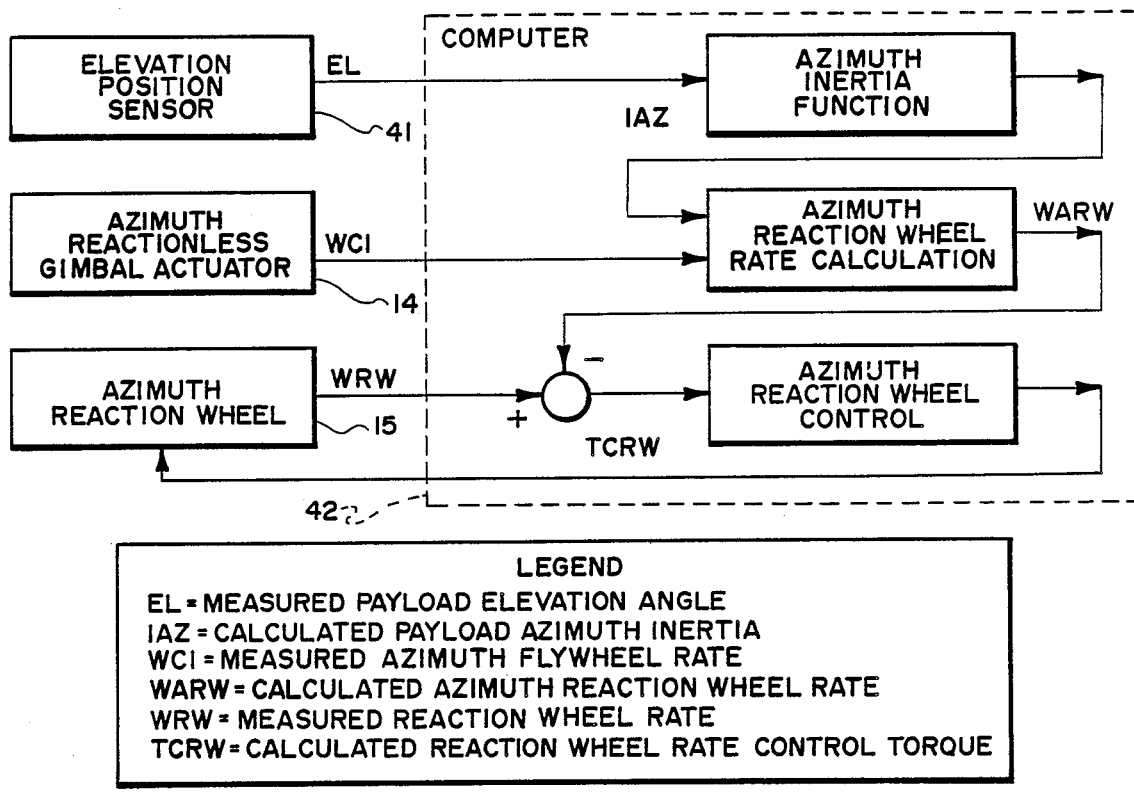
FIG. 3 illustrates the reaction wheel control means.

FIG. 3 illustrates the AZ-EL reaction wheel control means. An elevation position sensor 41 measures the payload 2 elevation angle which is used in the reaction wheel control computer 42 to calculate the azimuth inertia to be articulated. The azimuth angular rate generally too low to be measured accurately, however the rate of azimuth reactionless gimbal actuator flywheel 17 is physically constrained to be many times the payload 2 azimuth rate and is easily accurately measured. Flywheel 17 rate is used by computer 42 to calculate a reaction wheel flywheel 16 rate to make the combined momentum of the payload 2, flywheel 17 and reaction wheel flywheel 16 approximately zero. The computer compares the calculated flywheel 16 rate and the measured flywheel 16 rate to calculate reaction wheel 15 rate control torque.

Figure 4:
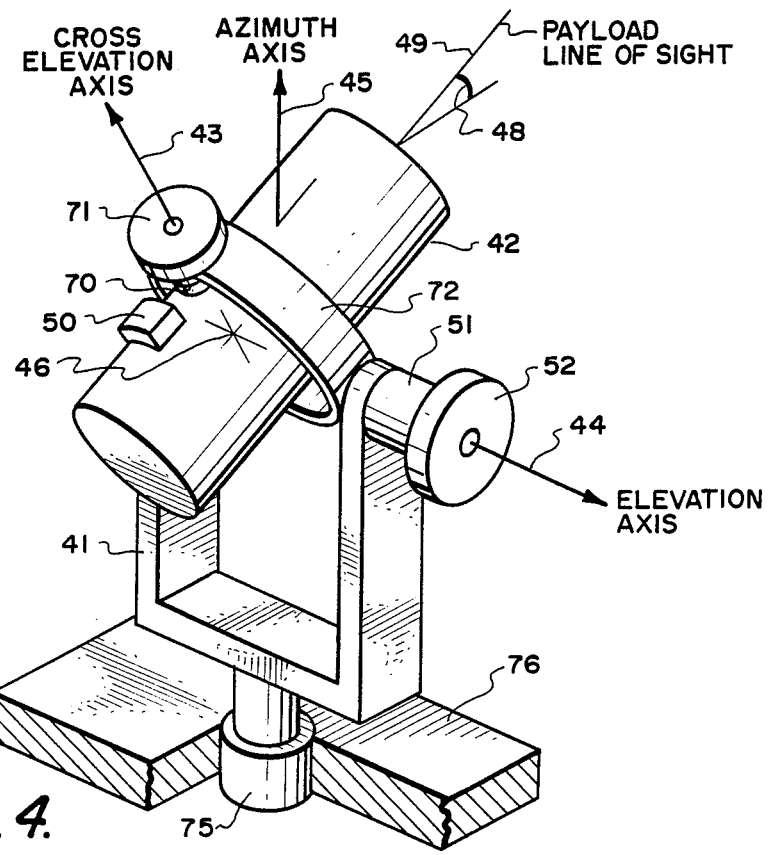
FIG. 4 illustrates the EL-XEL reactionless actuator-gimbal system configuration.

FIG. 4 illustrates the EL-XEL reactionless actuator-gimbal system gimbal structure 41 providing payload 42 rotational freedom around elevation axis 44, azimuth axis 45 and cross-elevation axis 43. Axes 43, 44, and 45 are intended to approximately intersect the combined mass center 46 of payload 42 and inertial reference unit 50.

Elevation reactionless actuator 51 torques an inertia including payload 42, inertial reference unit 50 and cross elevation gimbal structure 72, cross elevation reactionless actuator 70 and cross elevation reactionless actuator flywheel 71 relative to elevation reactionless actuator flywheel 52, and transfers all non-acceleration torques to structure 41. Actuator 51 provides control torque for large angle elevation positioning and small periodic angular disturbances. Payload 42 elevation inertia is a function of cross elevation angular displacement 48, but the cross elevation angular displacement 48 is limited by cross elevation gimbal strcture 72 to small angles, so that payload elevation inertia can be considered approximately constant. The angular momentum and acceleration torques of an approximately constant payload 42 elevation inertia can be effectively canceled by a constant inertia elevation reactionless actuator flywheel 52.

Cross elevation reactionless actuator 70 torques a constant inertia including payload 42 and inertial reference unit 50 relative to elevation reactionless actuator flywheel 71, and transfers all non-acceleration torques to cross elevation gimbal structure 72. Gimbal structure 72 restricts payload 42 cross elevation angular displacement 48 to small angles.

Azimuth actuator 75 torques structure 41 relative to structure 76 providing payload 42 with large angle azimuth axis 45 positioning control torques. However small angle payload 42 periodic pointing disturbances approximately otheogonal to the payload line of sight 49 and elevation axis 44 are controlled with the cross elevation reactionless actuator 71.

Having described the invention, I claim:

1. A reactionless actuator-gimbal system of the type having two rotational axes approximately through a payload mass center comprising:

a. a gimbal structure rotationally supporting the payload relative a support structure;

b. an azimuth reactionless actuator torquing the gimbal structure and the payoad around an azimuth axis approximately orthogonal to the support structure, the azimuth reactionless actuator having an azimuth motor stator and the gimbal structure attached to an azimuth harmonic drive flex spline, an azimuth motor rotor and an azimuth constant inertia flywheel attached to an azimuth harmonic drive wave generator, the support structurw attached to an azimuth harmonic drive circular spline, the azimuth reactionless actuator maintaining a ratio of the gimbal structure azimuth rate to azimuth constant inertia flywheel flywheel rate a negative constant with non acceleration torques acting on the gimbal structure cancelled by torque resulting from the intersection of the azimuth harmonic drive circular spline, the azimuth wave generator and the azimuth flexspline;

c. an elevation reactionless actuator torquing the payload around an elevation axis approximately orthogonal to the azimuth axis, the elevation reactionless actuator having an elevation motor stator and the payload attached to an elevation harmonic drive flex spline, an elevation motor rotor and an elevation constant inertia flywheel attached to an elevation harmonic drive wave generator, and the gimbal structure attached to an elevation harmonic drive circular spline, the elevation reactionless actuator maintaining a ratio of the payload elevation rate to the elevation constant inertia flywheel rate a negative constant with payload elevation non acceleration torques cancelled by torques resulting from an interaction of the elevation harmonic drive circular spline, the elevation harmonic drive wave generator and the elevation harmonic drive flexspline;

d. a reaction wheel attached to the gimbal structure with a reaction wheel flywheel rotational axis approximately parallel to the azimuth axis e. a reaction wheel control means controlling a combined azimuth angular momentum of the reaction wheel, the gimbal structure, the payload and the constant inertia azimuth flywheel to approximate zero.

2. A reactionless actuator-gimbal system of the type having two rotational axes comprising:

a. a gimbal structure supporting a payload with gimbal rotational axes approximately intersecting the payload mass center;

b. an azimuth reactionless actuator torquing a variable axis of inertia of the gimbal structure and a payload around an axis approximately orthogonal to a support structure;

c. an elevation reactionless actuator torquing a constant payload elevation inertia around an axis approximately orthogonal to the azimuth axis;

d. a reaction wheel attached to the gimbal structure with a reaction wheel flywheel rotational axis approximately parallel to the azimuth reactionless actuator rotational axis;

e. a reaction wheel control means controlling a combined azimuth angular momentum to be approximate zero.

3. A reactionless actuator-gimbal system of the type having two rotational axes approximately orthogonal to each other and a payload line of sight comprising:

a. a gimbal structure rotationally supporting the payload relative a support structure with gimbal rotational axes approximately intersecting a payload mass center;

b. a cross-elevation reactionless actuator torquing the payload around a cross-elevation axis approximately orthogonal to a payload line of sight, the cross-elevation reactionless actuator having a cross-elevation motor stator and the payload attached to a cross-elevation harmonic drive flex spline, a cross-elevation motor rotor and a cross-elevation constant inertia flywheel attached to a cross-elevation harmonic drive wave generator, the gimbal structure attached to a cross-elevation harmonic drive circular spline, the cross-elevation reactionless actuator maintaining a ratio of the payload cross-elevation rate to cross-elevation constant inertia flywheel flywheel rate a negative constant with payload cross-elevation, non acceleration torques cancelled by torque resulting from the interaction of the cross-elevation harmonic driver circular spline, the cross-elevation wave generator and the cross-elevation flexspline;

c. an elevation reactionless actuator torquing the payload around an axis approximately orthogonal to the cross elevation axis, the elevation reactionless actuator having an elevation motor stator and the payload attached to an elevation harmonic drive flex spline, an elevation motor rotor and an elevation constant inertia flywheel attached to an elevation harmonic drive wave generator, and the gimbal structure attached to an elevation harmonic drive circular spline, the elevation reactionless actuator maintaining a ratio of the payload elevation rate to the elevation constant inertia flywheel rate a negative constant with payload non acceleration elevation torques cancelled by torques resulting from an interaction of the elevation harmonic drive circular spline, the elevation harmonic drive wave generator and the elevation harmonic drive flexspline.

4. A reactionless actuator-gimbal system of the type supporting a pointed payload being torqued relative to a support structure with reactionless actuators which torque the pointed payload relative to constant inertia flywheels while transmitting minimum reaction torques to the support structure comprising:

a. a gimbal structure rotationally suppprting the payload with two reactionless, approximately mutually orthogonal rotational axes approximately intersecting a payload mass center;

b. a cross-elevation reactionless actuator torquing the payload relative to a constant inertia flywheel around an axis approximately orthogonal to a payload line of sight;

c. an elevation reactionless actuator torquing the payload relative to a constant inertia flywheel around an axis approximately orthogonal to the cross elevation axis and approximately orthogonal to the payload line of sight;

d. an azimuth actuator torquing the gimbal structure supporting the payload relative to the support structure about an axis approximately orthogonal to an elevation axis.

* * * * *